United States Patent [19]

Lewis

[11] Patent Number: 5,589,746

[45] Date of Patent: Dec. 31, 1996

[54] BRUSHLESS MOTOR SPEED CONTROL ARRANGEMENT HAVING DERIVED COMMON MODE SUPPLY SIGNAL COMPONENT

[75] Inventor: Martyn A. Lewis, Pacific Palisades, Calif.

[73] Assignee: Seagate Technology, Inc., Scotts Valley, Calif.

[21] Appl. No.: 336,981

[22] Filed: Nov. 10, 1994

[51] Int. Cl.$^6$ .................................................. H02P 7/00
[52] U.S. Cl. ........................ 318/439; 318/254; 318/696
[58] Field of Search .......................... 318/254, 138, 318/439, 696, 685

[56] References Cited

U.S. PATENT DOCUMENTS

| | | | |
|---|---|---|---|
| 3,942,084 | 3/1976 | Louth | 318/138 |
| 3,974,428 | 8/1976 | Hafle | |
| 4,371,818 | 2/1983 | Lewis | 318/254 X |
| 4,751,438 | 6/1988 | Markunas | 318/254 |
| 4,835,448 | 5/1989 | Dishner et al. | 318/254 |
| 5,004,965 | 4/1991 | Otokawa et al. | 318/254 |
| 5,023,527 | 6/1991 | Erdman et al. | 318/254 |
| 5,023,528 | 6/1991 | Siadin et al. | 318/254 |
| 5,144,210 | 9/1992 | Sato | 318/138 X |
| 5,177,417 | 1/1993 | Lee et al. | |

FOREIGN PATENT DOCUMENTS

0469617A1  2/1992  European Pat. Off.

OTHER PUBLICATIONS

"Expert System, Fuzzy Logic, and Neural Network Applications in Power Electronics and Motion Control," by Bose, Proceedings of the IEEE, vol. 82, No. 8, Aug. 1994, pp. 1303–1323.

*Primary Examiner*—Jonathan Wysocki
*Attorney, Agent, or Firm*—Lowe, Price, LeBlanc & Becker

[57] ABSTRACT

A method and apparatus for increasing the top speed of a brushless DC motor (BLDCM) or a closed loop step motor (CLSM) which are driven by substantially sinusoidal signals on each of its leads. An additional signal is generated which has a fundamental frequency component at a harmonic of the frequency of the main sine wave signals applied to the motor leads. The additional signal is added to the normally applied signal on each motor lead. The amplitude and phase of the additional signal are chosen to increase the top speed of the motor, or alternatively, to reduce the supply voltage needed for a given speed.

9 Claims, 13 Drawing Sheets

BRUSHLESS MOTOR SPEED CONTROL ARRANGEMENT HAVING DERIVED COMMON MODE SUPPLY SIGNAL COMPONENT

CROSS-REFERENCE TO RELATED APPLICATIONS

The present application is related to the following U.S. patent applications, all filed concurrently with or prior to the present application:

1. "Arcuate Scan Tape Drive," inventors John M. Rothenberg, Joseph Lin, Robert H. Peirce, Richard Milo and Michael Andrews, Ser. No. 08/113,996, filed Aug. 30, 1993.

2. "Arcuate Scan Read/Write Assembly," inventors Gary Nelson and Stephen J. Crompton, Ser. No. 08/337,255, filed Nov. 10, 1994.

3. "Economical Wide Range Speed Control System," inventor Martyn A. Lewis, Ser. No. 08/337,803, filed Nov. 14, 1994.

4. "System and Method For Accurate Arcuate Scan Head Position," inventors Martyn A. Lewis and Paul Stavish, Ser. No. 08/337,093, filed Nov. 10, 1994.

The above applications are all assigned to the assignee of the present invention and are all expressly incorporated herein by reference.

FIELD OF THE INVENTION

The present invention relates generally to motor speed control systems and, in particular, to a system to maximize the top speed of commutated motors including brushless DC motors relative to the given motor supply voltage.

BACKGROUND OF THE INVENTION

There has been and continues to be a need to efficiently maximize the operational speed of brushless DC motors, and step motors in general. Brushless DC motors are multi-phased, typically 3 phased, motors that are commutated by the selective application of winding drive signals applied in reference to the motor shaft rotational position. Step motors and synchronous motors, when driven in a closed loop mode, behave in the same way as a brushless DC motor. For purposes here, brushless DC motors shall be considered to include step motors and synchronous motors. A basic understanding of such motor structures and operation is provided by Acarnley, "*Stepping Motors: A Guide to Modern Theory and Practice*", Peter Peregrinus Ltd., London, U.K., (1982/1984).

Brushless DC motors are often operated under closed loop control based on control signals generated by a motor shaft position transducer. Various sensor arrangements are known, including those based on Hall effect sensors, shaft mounted optical encoders, and other dedicated sensor/circuit systems.

Brushless DC motors generally exhibit a quasi-sinusoidal variation of torque with shaft position when one phase is excited with a constant current. Correspondingly, when the motor is driven by an external prime mover at a constant speed, and all the phases are open circuited, each phase generates a quasi-sinusoidal back EMF signal at a frequency and amplitude proportional to speed. The phase signal referred to in the previous sentence is understood to mean the voltage between the phase lead and the center tap in the case of a Wye wound motor, or the equivalent notional center tap for a Delta wound motor. Therefore, the supply voltage needed to sustain a desired speed increases in rough proportion with increasing speed. The back EMF is a proportion of the voltage that must be applied to the brushless DC motor to sustain a given shaft rotational speed.

In commutating brushless DC motors, the commutation waveforms of the power signals applied to the motor phase windings must be synchronized with the motor shaft position. A number of different general commutation waveforms have been used. Periodic rectangular waveforms are advantageous to produce a maximum top speed for the motor at a given supply voltage.

However, a disadvantage of using rectangular waveforms is that harmonic currents are created which heat the motor windings, but do not contribute to the production of torque. In addition, in many control systems, it is desirable to employ transconductance or high output impedance power amplifiers. By use of such drive amplifiers, the frequency response characteristics of the motor are relatively unaffected by temperature and motor impedance. However, the current waveform that results from a rectangular drive voltage typically has a peculiar shape due to the complexities of motor conductance and back EMF. Consequently, rectangular drive waveforms are difficult to apply in practice with high output impedance amplifiers.

Another method of achieving higher top speeds with a fixed supply voltage is to advance the phase of the drive signals as the required motor speed is increased. This method is described in Acarnley and Gibbons, "*Closed Loop Control of Stepping Motors: Prediction and Realization of Optimum Switching Angle*", Proceedings IEE (London), Vol. 129, Part B, No. 4, 1982, and also in Dr. L. Antognini, "*Dynamic Torque Optimization Of a Step Motor by Back EMF Sensing,*" Proceedings of 14th Annual Symposium, Incremental Motion Control Systems and Devices, 1985, pages 293, et seq., published by Incremental Motion Control Systems Society, Champaign, Ill., 61825. This method can be used with any shape waveform. The method generally requires use of an encoder in order to produce a sufficient resolution of the rotational position of the motor shaft.

SUMMARY OF THE INVENTION

Therefore, a general purpose of the present invention is to provide a system for efficiently maximizing motor operational speed for a given supply voltage.

The present invention permits lower supply voltages to achieve the same top speed as conventional speed control systems while driving the same load or, alternatively, achieving greater speeds without changing the supply voltages. The invention achieves this result by employing a method that never demands "unbalanced" positive and negative supply voltages, irrespective of motor shaft position. The present invention uses a low cost magneto resistive encoder to provide precision shaft position sensing. The invention can be used with other types of shaft position sensors such as optical encoders. The method uses an additional voltage, hereinafter referred to as a common mode voltage (CMV), that is additional to the normal drive voltages ordinarily supplied to the motor leads. The CMV has a fundamental component that is at a harmonic of the fundamental component of the ordinarily supplied drive waveform. The amplitude and phase of the CMV may be chosen to provide additional voltage "headroom" so that higher speeds are attainable with a given supply voltage.

An advantage of the present invention is the ability to relatively increase the top speed of a brushless DC motor or closed loop step motor without increasing the supply voltage.

Another advantage of the present invention is the ability to sustain a given top speed at a lower supply voltage.

A further advantage of the present invention is the ability of motors to achieve higher speeds while maintaining the preferred characteristics of sinusoidal or nearly sinusoidal drives.

Yet another advantage of the present invention is the ability to enhance the acceleration torque of a motor from a given supply voltage at high speeds. In addition, for a given top speed and load, the power taken from the power supply is less than prior art methods.

Still another advantage of the present invention is that both high and low output impedance driver amplifiers may be used in implementing the invention.

Yet still another advantage of the present invention is that very few low cost and low complexity parts are required to implement the invention.

Yet still a further advantage of the present invention is that there are no new or increased existing motor inefficiencies that arise as a consequence of using the present invention.

BRIEF DESCRIPTION OF THE DRAWINGS

Additional advantages, features and characteristics of the present invention will become more clearly understood from the following description of the embodiments when taken in conjunction with the accompanying drawings, wherein like reference numerals designate like parts, and wherein.

DETAILED DESCRIPTION OF THE EMBODIMENTS

Although the present invention is applicable to brushless DC motors of arbitrary numbers of phases and poles, the invention will be described with respect to a three-phase, two-pole motor. Such motors are conventionally available with three or four leads. Three lead motors may be either "Wye" or "delta" wound; four lead motors are always "Wye" wound. The present invention may be used with either configuration, but will be described for a three lead Wye wound motor. An exemplary description of the motor used in the preferred embodiment of the present invention can be found in a co-pending application entitled "Arcuate Scan Tape Drive," having Ser. No. 08/113,996, filed Aug. 30, 1993, which is assigned to the assignee of the present application. The motor described in the aforesaid application propagates a tape at substantially 0.5734 ips when information is being written to the tape and substantially 0.5734 ips when information is being read from the tape. However, speeds up to substantially 72 ips while in a search mode can be achieved using the method described below.

Figure 1:
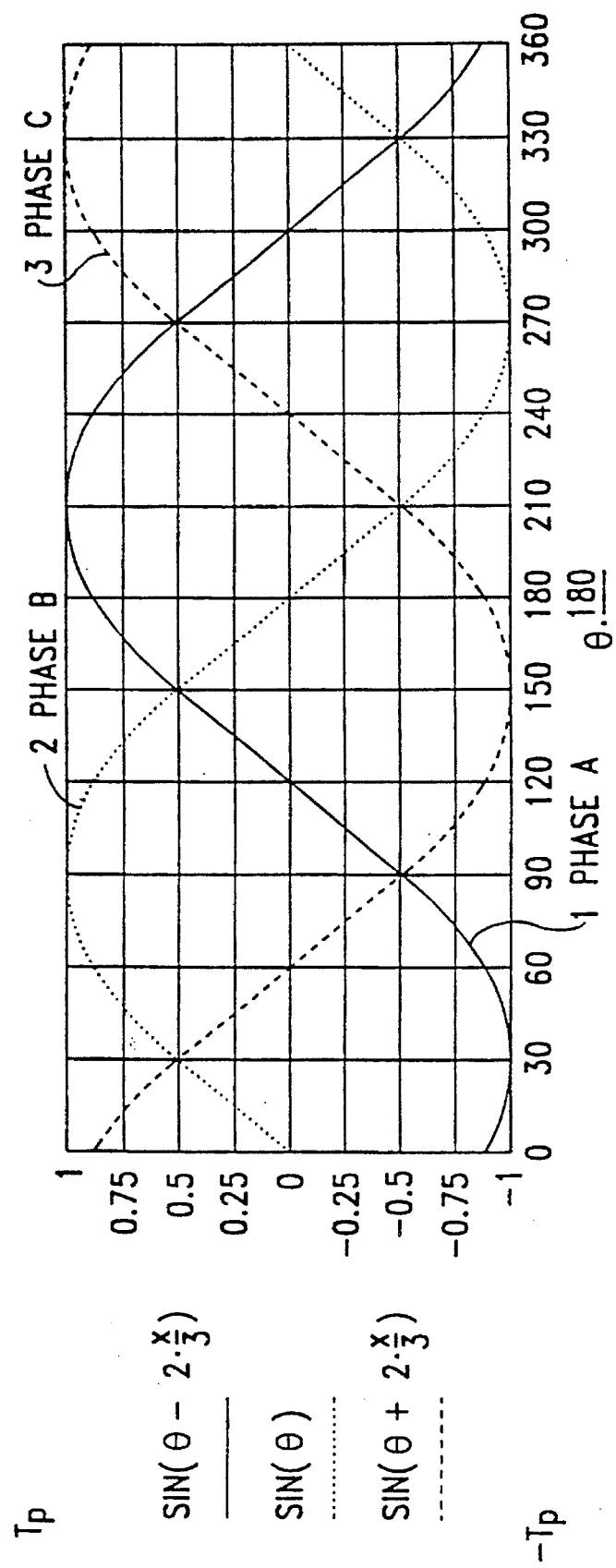
FIG. 1 illustrates the phase relationships of the torque produced by each phase winding of a brushless DC motor when each winding is excited independently with a constant current.

Sine waveforms are preferred for driving brushless DC motors because of reduced or minimal harmonic currents. Sine waveforms also tend to provide a more nearly constant production of torque as a function of motor shaft angle. A sine waveform is used in FIG. 1 to show the phase relationship of the torque produced by each phase of the motor when each phase is separately excited with the same constant current. Phases A, B, and C are designated by traces 1, 2 and 3, respectively.

Figure 2:
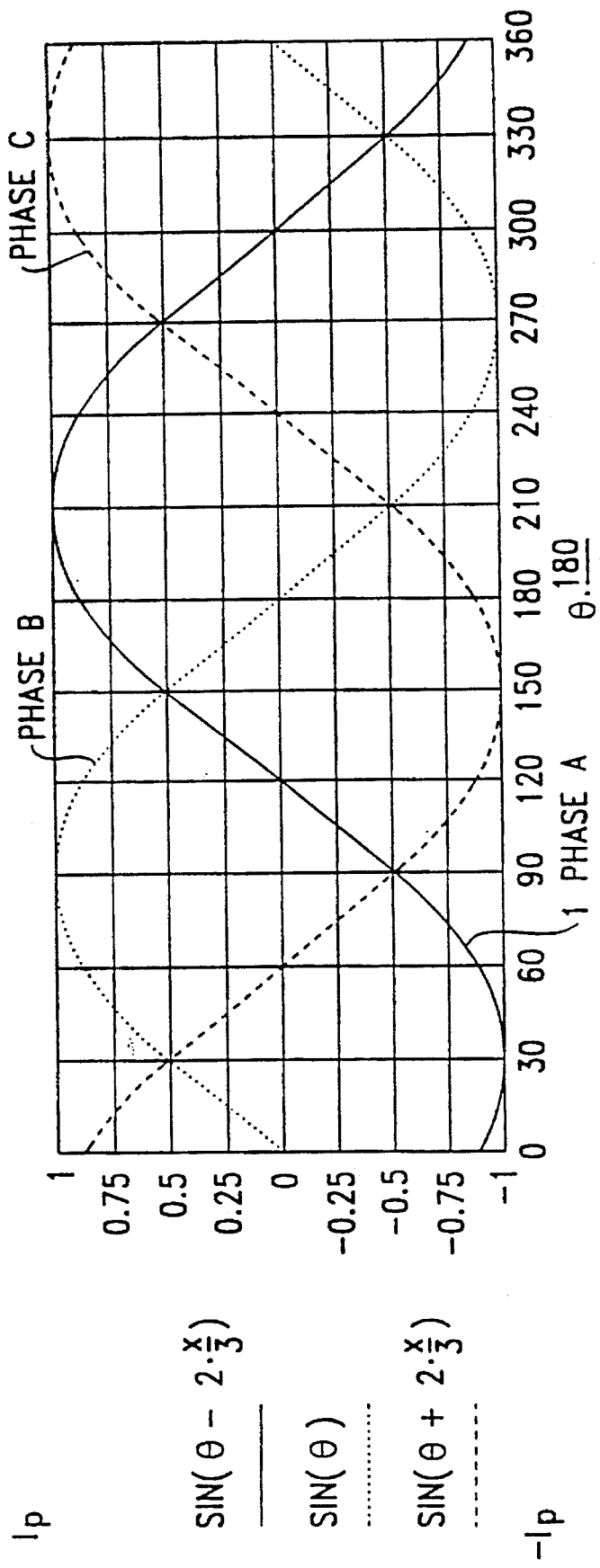
FIG. 2 illustrates the phase currents, as a function of motor shaft position, required to maintain a three-phase, two-pole motor at a uniform shaft speed while delivering a uniform torque to a load.

Now consider a brushless DC motor driven by phase winding currents that are a sinusoidal function of motor shaft position, as depicted in FIG. 2. These current waveforms are in accordance with the limitation that their algebraic sum must be zero. Denoting the three motor phases by Phase A, Phase B, and Phase C, respectively, the formulae for the three instantaneous phase winding currents, $i_A$, $i_B$, $i_C$, are respectively:

$$i_A(I,\theta) = I\sin\left(\theta - 2\frac{\pi}{3}\right) \quad (1)$$

$$i_B(I,\theta) = I(\theta)$$

$$i_C(I,\theta) = I\sin\left(\theta + 2\frac{\pi}{3}\right)$$

The total instantaneous torque produced by the motor is defined as the sum of the instantaneous torque contributed by each phase, due to the instantaneous phase winding currents of FIG. 2. The formula for the torque is:

$$T_t(I,\theta) = i_A K_{ph}\sin\left(\theta - 2\frac{\pi}{3}\right) + i_B K_{ph}\sin(\theta) + i_C K_{ph}\sin\left(\theta + 2\frac{\pi}{3}\right) \quad (2)$$

in which $i_A$, $i_B$, and $i_C$ are given above by equation 1.

Substituting the known relationships for the instantaneous currents from equation 1 into equation 2:

$$T_t(I,\theta,K_{ph}) = IK_{ph}\sin\left(\theta - 2\frac{\pi}{3}\right)^2 + IK_{ph}\sin(\theta)^2 + IK_{ph}\sin\left(\theta + 2\frac{\pi}{3}\right)^2 \quad (3)$$

simplifying this yields:

$$T_t(I,K_{ph}) = \frac{3}{2} IK_{ph} \quad (4)$$

Thus, the torque produced by the sinusoidal current waveforms shown in FIG. 2 is independent of shaft angle. This means that a uniform load will be driven at a uniform speed with the three motor windings carrying currents with a peak value determined by the load and waveshapes in accordance with the waveshapes of FIG. 2.

The voltage required at each motor lead to sustain a uniform speed and produce a uniform torque is affected by the phase back EMF, the phase resistance, and the phase inductance. If the motor is electrically well balanced, the unused center tap will remain at or near ground potential while the motor is running. If the motor is delta wound, having no center tap, there is a "phantom" center tap of an equivalent Wye wound motor that equivalently remains at or near ground.

The relationship of motor shaft angle to motor speed is $$\theta(\Omega, t) = \Omega t \quad (5)$$

where the assumed constant angular speed of the motor is expressed as D radians/second and time is expressed as t seconds. In the above case of constant speed operation, the instantaneous voltages required at each motor lead are:

$$v_A(i_A, \Omega, t, R, L, K_{ph}) = i_A R + i_A j \Omega N P L + \quad (6)$$
$$K_{ph}\Omega\sin\left(\Omega t - 2\frac{\pi}{3}\right)$$
$$v_B(i_B, \Omega, t, R, L, K_{ph}) = i_B R + i_B j \Omega N P L + K_{ph}\Omega\sin(\Omega t)$$
$$v_C(i_C, \Omega, t, R, L, K_{ph}) = i_C R + i_C j \Omega N P L +$$
$$K_{ph}\sin\left(\Omega t + 2\frac{\pi}{3}\right)$$

where the square root of minus 1 (−1) is j; the instantaneous phase currents are $i_A$, $i_B$, and $i_C$ amperes; time is t seconds; per phase resistance is expressed as R ohms, where the per phase resistance is defined between the motor phase lead and the motor center tap or its notional equivalent; per phase inductance is L henries, where the per phase inductance is defined between the motor phase lead and the motor center tap or its notional equivalent; per phase motor constant is $K_{ph}$ volts/radian/second, where the per phase motor constant is defined as the back EMF between the motor phase lead and the motor center tap or its notional equivalent; the instantaneous phase applied drive voltages are $v_A$, $v_B$, and $v_C$ volts; the number of phases of the motor is represented by N and the number of poles of the motor is represented by P. In the above example, N equals 3 and P equals 2.

Using the above equations for the instantaneous phase currents, and the relationship between motor angle and motor speed, the instantaneous phase voltages may be written as:

$$v_A(I, \Omega, t, R, L, K_{ph}) = IR\sin\left(\Omega t - 2\frac{\pi}{3}\right) + \quad (7)$$
$$INPL\Omega\cos\left(\Omega t - 2\frac{\pi}{3}\right) +$$
$$k_{ph}\Omega\sin\left(\Omega t - 2\frac{\pi}{3}\right)$$
$$v_B(I, \Omega, t, R, L, K_{ph}) = IR\sin(\Omega t) + INPL\Omega\cos(\Omega t) + K_{ph}\Omega\sin(\Omega t)$$
$$v_C(I, \Omega, t, R, L K_{ph}) = IR\sin\left(\Omega t + 2\frac{\pi}{3}\right) +$$
$$INPL\Omega\cos\left(\Omega t + 2\frac{\pi}{3}\right) +$$
$$K_{ph}\Omega\sin\left(\Omega t + 2\frac{\pi}{3}\right)$$

Figure 3:
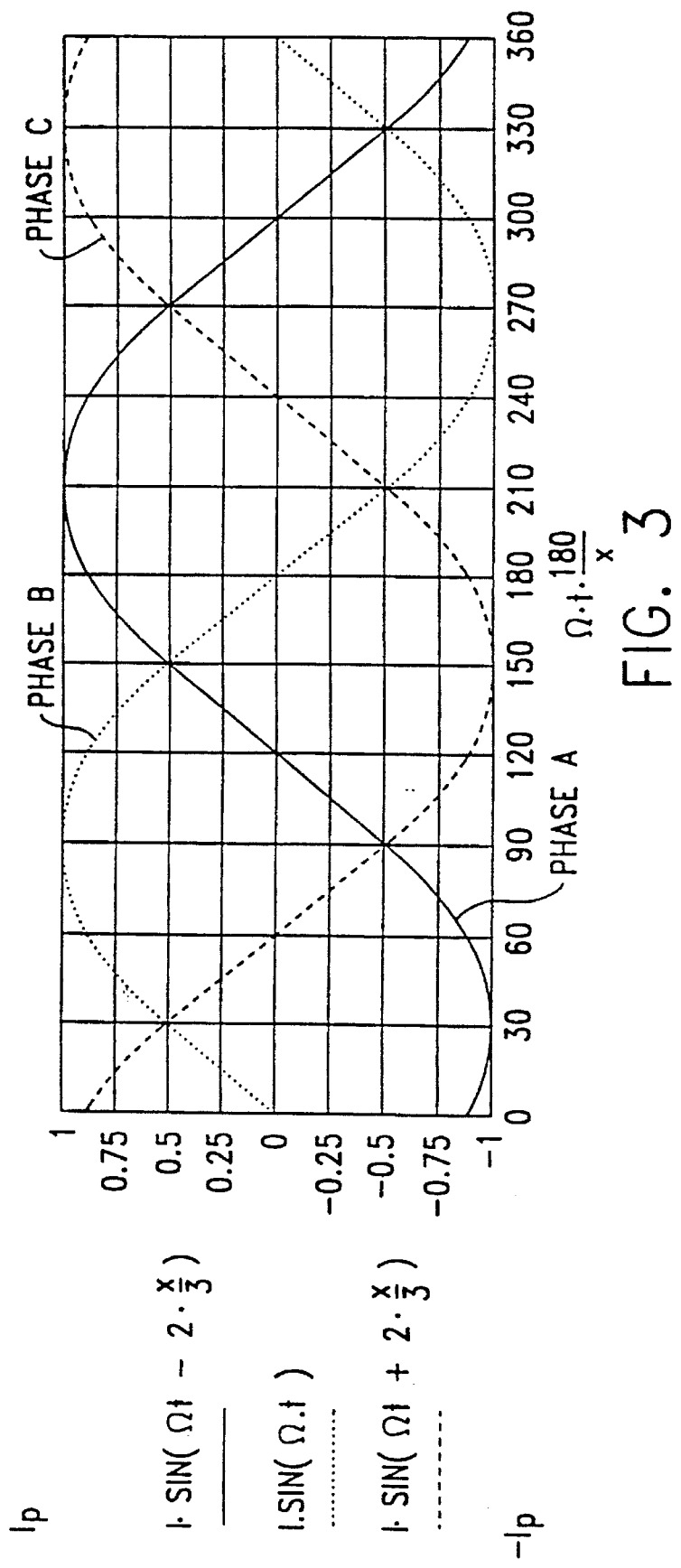
FIG. 3 illustrates the motor phase currents, as a function of shaft position, required to maintain a three-phase, two-pole motor at a uniform shaft speed while delivering a uniform torque to a load.
Figure 4:
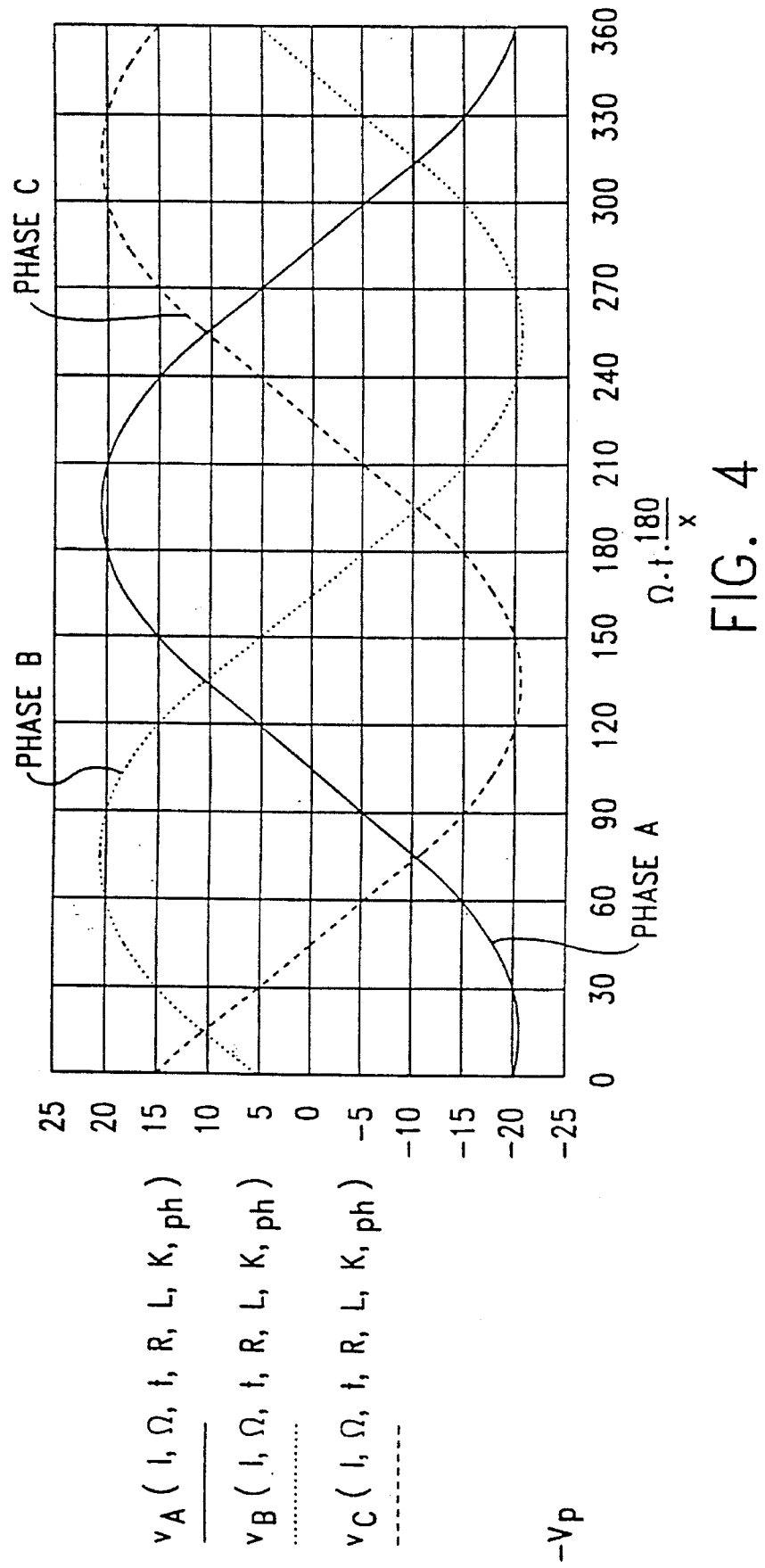
FIG. 4 illustrates the phase drive voltages, as a function of shaft position, required to maintain a three-phase, two-pole motor at a uniform shaft speed while delivering an uniform torque to a load.

Using the above equations, FIG. 3 plots the current for each phase, and FIG. 4 plots the necessary applied voltage for each phase to maintain a constant speed. In each of these figures, the phases are denoted A, B, and C, respectively.

In conventional sinusoidal drive systems, positive and negative supply voltages must be designed to supply the positive and negative peak voltages as depicted in FIG. 4. Inspection of the required drive voltages depicted in FIG. 4 reveals the following facts:

(1) At a motor shaft angle of approximately 45°, Phase A requires a drive voltage of about 87% of the negative peak drive voltage, while Phase B requires a drive voltage of about 87% of the positive peak voltage. Phase C requires zero voltage. At this phase angle, the drive voltage needs, and therefore the supply voltage needs of the motor may be said to be "balanced" with respect to the positive and negative supplies.

(2) At a motor shaft angle of approximately 15°, Phases B and C require about 50% of the peak positive drive voltage, while Phase A requires 100% of the peak negative voltage. At this phase angle, the voltage requirements, and therefore the supply voltage requirements of the motor are "unbalanced" with respect to the positive and negative supplies.

(3) Within each revolution, there are six shaft angle positions requiring balanced drive conditions: the first at approximately 45°, the other five spaced at successive 60° intervals from the first position.

(4) Within each revolution, there are six extremely unbalanced drive conditions: the first at approximately 15°, the other five spaced at successive 60° intervals from the first unbalanced condition. In the first, third and fifth positions at shaft angles of 15, 135 and 255 degrees, respectively, the unbalanced condition dictates a positive supply voltage sufficient to overcome the driver amplifier loses added to the positive peak voltage depicted in FIG. 4. In the second, fourth, and sixth positions at shaft angles of 75, 195, and 315 degrees, respectively, the unbalanced condition dictates a negative supply voltage sufficient to overcome the driver amplifier losses added to the peak negative drive voltage depicted in FIG. 4. With the specific motor and load of this example, the positive and negative power supplies must deliver nearly 22 volts, if allowance of one volt is made to account for driver amplifier losses.

Figure 5A:
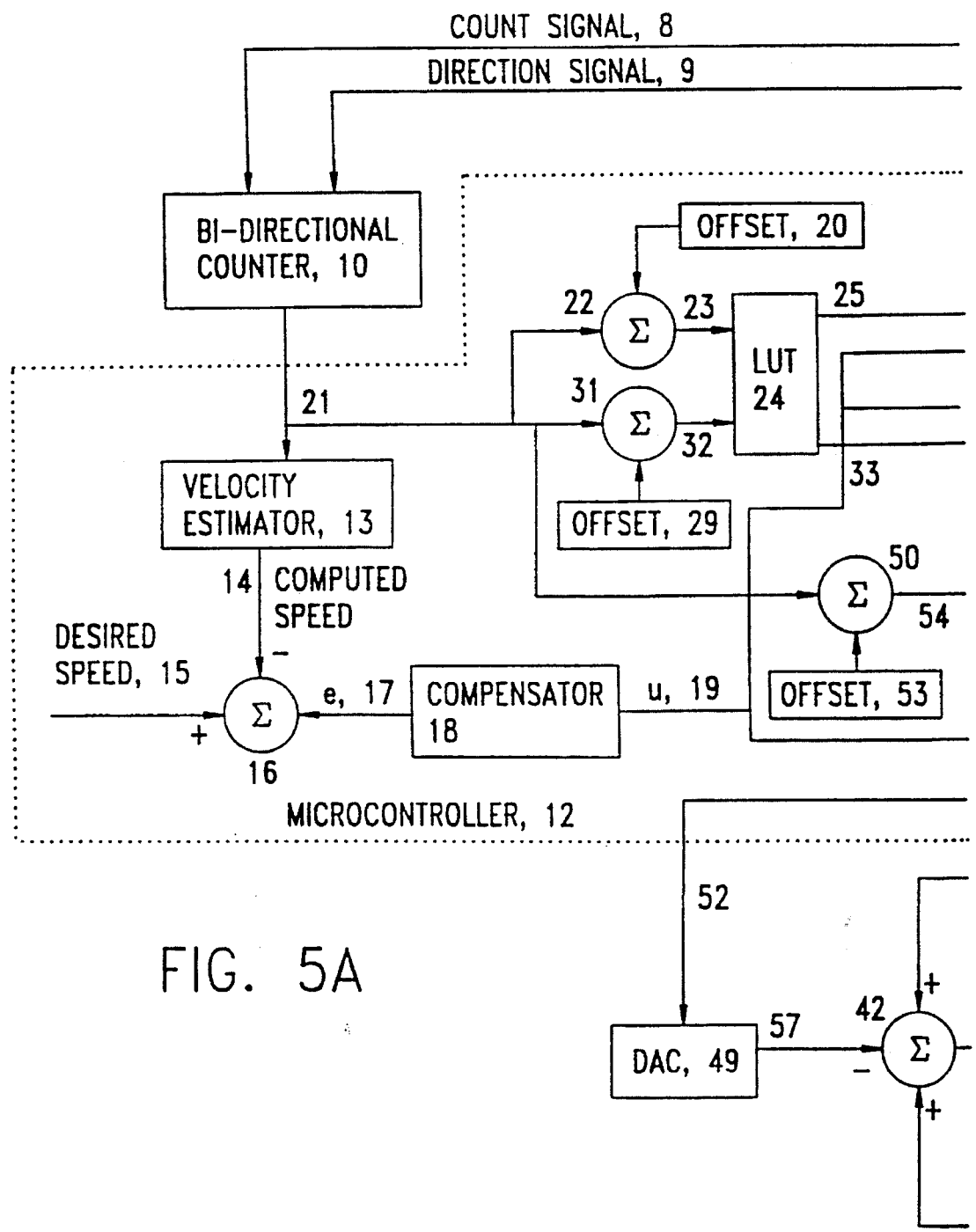
FIG. 5 is a block diagram of one preferred embodiment of an apparatus constructed in accordance with the present invention.
Figure 5B:
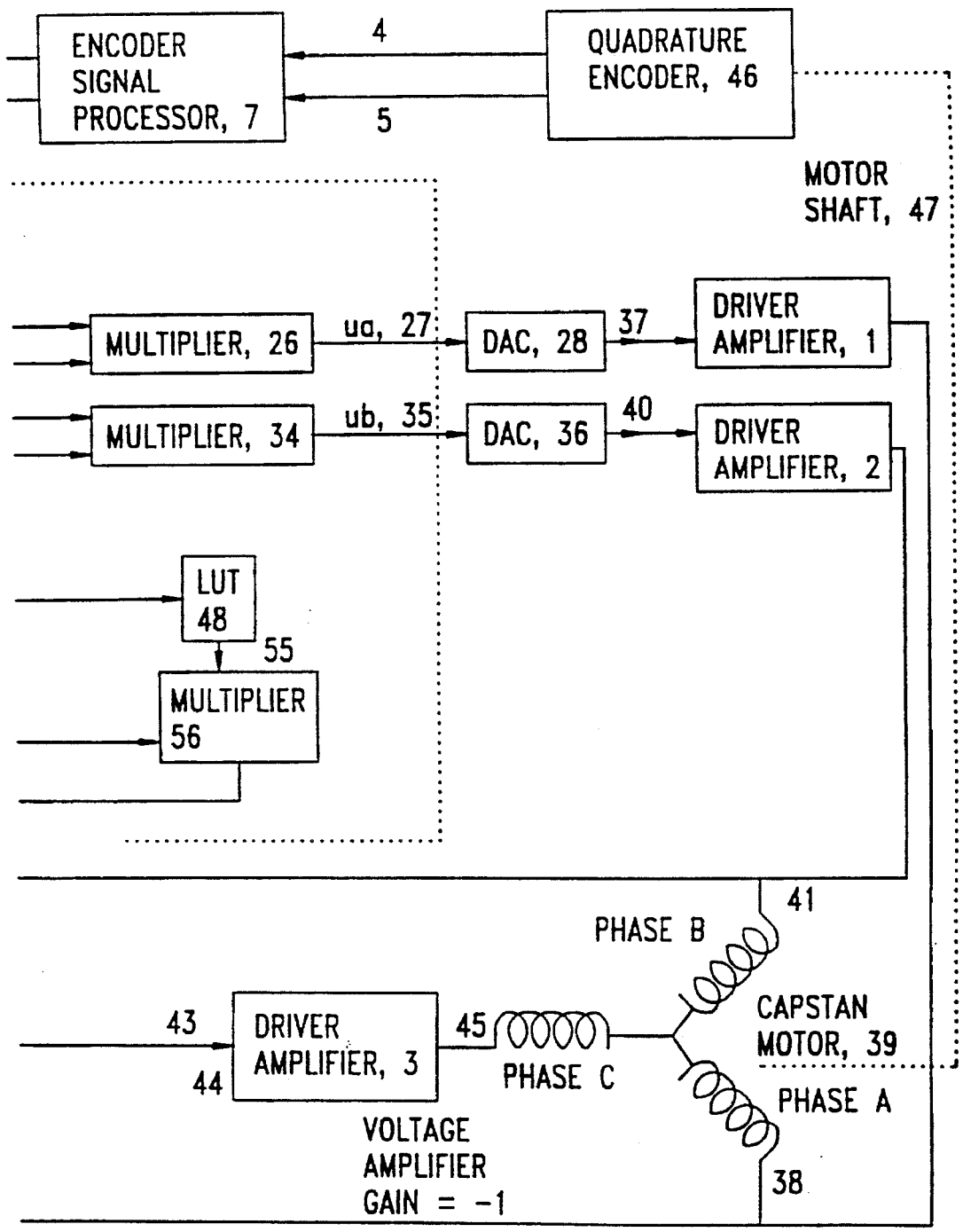

A preferred electronic circuit architecture implementing the present invention is shown in FIG. 5. FIG. 5 shows a drive arrangement using high output impedance transconductance unity gain driver amplifiers 1 and 2 and a low output impedance, phase inverting, unity gain driver amplifier 3, driving the motor phase windings A, B and C, at 38, 41 and 45, respectively. Driver amplifier 3 has a gain of minus 1. A quadrature encoder 46, which in the preferred embodiment is a MR encoder, that produces two output signals on lines 4 and 5, respectively, is coupled to the motor shaft 47 of the capstan motor 39. The encoder 46 produces a square wave signal on line 4 that repeats several hundred times per revolution of the motor shaft 47. The encoder 46 also produces a square wave on line 5 having the same number of repetitions per revolution as the square wave on line 4 and further having an approximately 90° phase relationship with the square wave on line 4. A description of the quadrature encoder 46 used in the preferred embodiment of the present invention is described in a co-pending patent application that is assigned to the assignee of the present invention entitled "Arcuate Scan Tape Drive," inventor John M. Rothenberg et al., Ser. No. 08/119,996, filed Aug. 30, 1993 and is herein incorporated by reference. The encoder signals are processed as described in the co-pending patent "Economical Wide Range Speed Control System."

The square waves present on lines 4 and 5 are combined in a signal processor 7 thereby producing a counting signal on line 8 that has a specified polarity transition for each period of the square wave on line 4 and a direction signal on line 9 whose level (high or low) indicates the direction of travel of the motor shaft 47. When the square wave on line 4 leads the square wave present on line 5, the motor shaft 47 is travelling in a counterclockwise direction as viewed from the visible end of the motor shaft and the direction signal on line 9 is active high. On the other hand, when the square wave 4 is trailing the square wave present on line 5, the motor shaft 47 is travelling in a clockwise direction with the direction signal on line 9 having a low value. The clockwise and counterclockwise directions are defined by viewing the motor from the end at which the motor shaft 47 is visible. The counting signal on line 8 and the direction signal on line 9 are passed to a bi-directional counter 10 that contains a binary number representing an instantaneous motor shaft angle. Shaft position zero, by definition, is made to correspond with the position of the motor 39 at which Phase B 41 has zero torque for any commutation current, and at which Phase A 38 produces a counter clockwise torque in response to a positive commutation current (i.e., a current directed into Phase A 38). Although there is no index signal passed to the bi-directional counter 10 in this invention for the purpose of reducing cost, the start up routine for the drive arrangement can be found in a co-pending application assigned to the assignee entitled "Economical Wide Range Speed Control System," inventor Martyn A. Lewis, Ser. No. 08/237,803, filed Nov. 14, 1994. The output of the bi-directional counter is passed to the microcontroller 12 (shown in dashed outline) via line 21. In the preferred embodiment, the microcontroller is a 80C196 microcontroller manufactured by Intel. During a computation cycle, usually called the servo sampling interval, the microcontroller 12 performs a series of calculations to produce two sinusoidal control signals on lines 27, 35 and a common mode signal on line 52 that are used to commutate the Phase windings of the motor 39.

The bi-directional counter output on line 21 is passed to the microcontroller 12 through the use of a velocity estimator 13, to obtain the present speed of the motor shaft 47 on line 14. The computed shaft speed on line 14 is subtracted from the desired speed 15 at subtractor 16, to obtain a speed error e of the motor 39 on line 17. The speed error e on line 17 is transmitted to a compensator 18 whose output is a control authority signal u on line 19. A first offset signal 20 having a value of 22° for every 62 ips, proportional to shaft speed is added to the bi-directional counter output on line 21 at adder 22 thereby generating a phase advanced signal of the bi-directional counter 10 output on line 23. Note that all degrees described are commutation degrees, not shaft degrees. For a N phase, P pole motor, there are NP commutation degrees for each shaft degree. In the preferred embodiment there are six commutation degrees per shaft degree. The phased advanced signal on line 23 is used to address a look-up table (LUT) 24 containing digital words that are a sinusoidal function of the address transmitted to the LUT 24 on line 23. The output of the LUT 24 on line 25, is multiplied by the control authority signal u on line 19, at multiplier 26 to produce a modified authority signal ua on line 27. The modified authority signal ua on line 27 is transmitted to a first digital-to-analog converter (DAC) 28 whose output is a first control signal on line 37. The control signal on line 37 is transmitted to a transconductance driver amplifier 1 to deliver a prescribed current, sinusoidally related to the shaft position 47 to commutate Phase A 38 of the motor 39. A second offset signal 29 having a value of 120° plus 22° for every 62 ips, proportional to shaft speed is added to the bi-directional counter output on line 21 via adder 31 thereby generating a phase advanced signal of the bi-directional counter 10 output on line 32. The phase advanced signal on line 32 is used to address the LUT 24 whose output on line 33 is multiplied by the control authority signal u on line 19, via multiplier 34, to obtain a modified authority signal ub on line 35. The modified authority signal ub on line 35 is transmitted to a second DAC 36 whose output is a second control signal on line 40. The second control signal on line 40 is transmitted to the transconductance driver amplifier 2 which delivers a prescribed current, sinusoidally related to the shaft position 47 to Phase B 41 of the motor 39.

In order to generate the CMV signal on line 57, a third offset 53 having a value of 180° plus one-third (⅓) of 22° for every 62 ips is added to the bi-directional counter output on line 21 at adder 50. The output signal of the adder 50 on line 54, is used to address the LUT 48. The contents of the LUT 48 are such as to ultimately produce the CMV signal on line 57 corresponding to the CMV signal depicted in FIG. 6. The amplitude of the CMV signal is proportional to speed and is empirically determined to be 5 volts peak-to-peak per 60 ips. Further improvements in speed may be attained by empirically ascertaining an optimum value for the third offset in accordance with the speed of operation.

Figure 6:
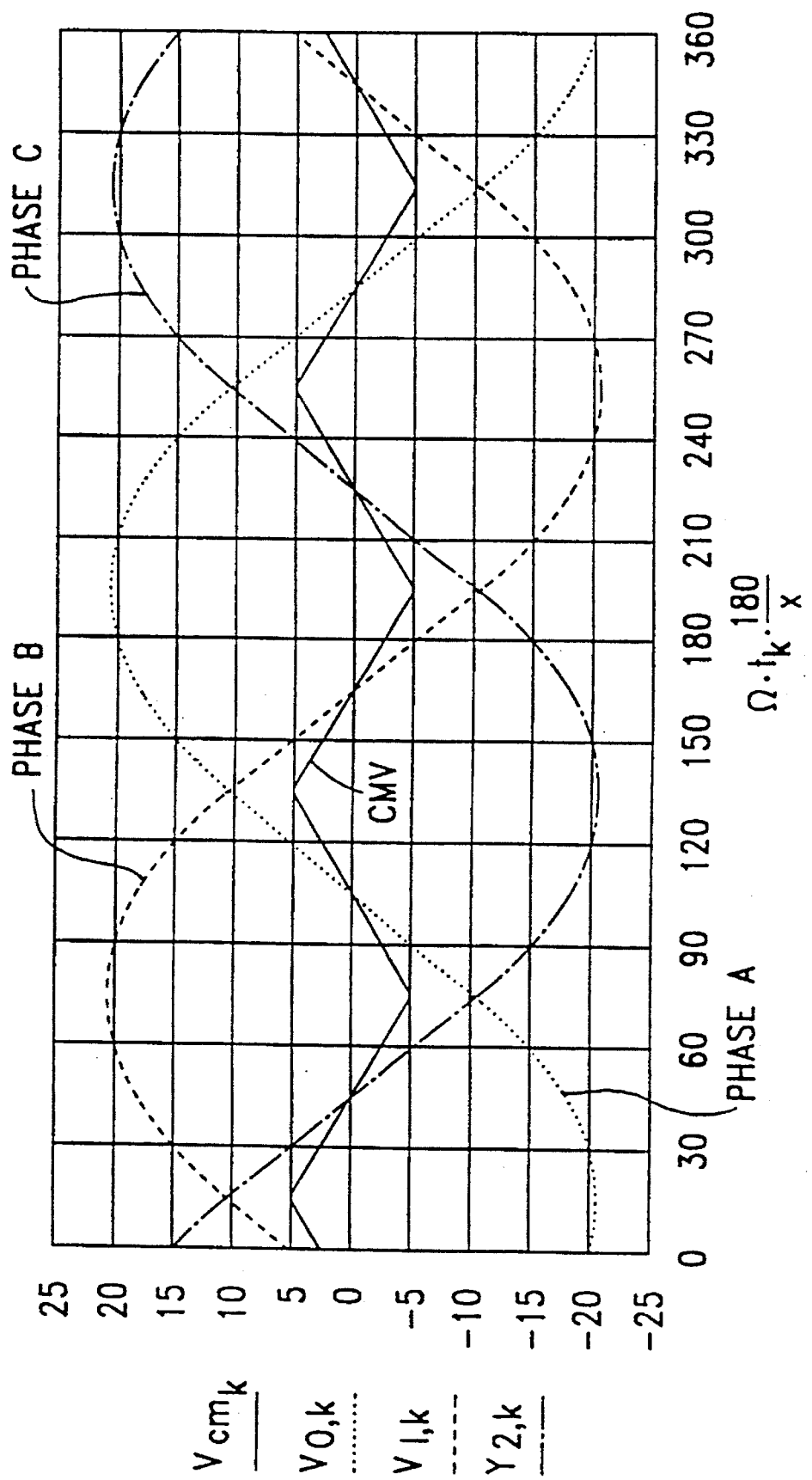
FIG. 6 illustrates the common mode voltage required to achieve balanced positive and negative supply requirements independent of shaft position.

The output of the LUT 48 on line 55 is multiplied by the control authority signal u on line 19 at multiplier 56 to obtain a digital representation of the CMV signal on line 52. The digital representation of the CMV signal on line 52 is passed through a DAC 49 whose output is the CMV signal as depicted in FIG. 6 on line 57. The multiplier 56 ensures that the CMV signal on line 57 is proportional to the other drive voltages. The CMV signal on line 57 is combined with the outputs of the driver amplifiers 1 and 2, respectively, at analog adder 43 whose output on line 44 is transmitted to the phase inverted driver amplifier 3 to commutate Phase C 45 of the motor 39. Since driver amplifier 3 is inverting, the CMV waveform on line 57 is subtracted from the driver amplifier voltages at analog adder 43. In this way, the CMV signal on line 57 is introduced as a common additive voltage signal to Phase C 45 and motor 39. As a result of using transconductance driver amplifiers 1 and 2, respectively, the CMV signal on line 57 is automatically experienced at motor leads 38 and 41, respectively. It is not possible for all three driver amplifiers to be transconductance amplifiers because any small deviation in their gains from a perfectly matched condition will result in one or more of the amplifiers saturating. Fortunately, all the virtues of a high impedance drive to the motor 39 are obtained with only two of three driver amplifiers configured as transconductance amplifiers. Because driver amplifiers 1 and 2, respectively, are transconductance amplifiers with high output impedances, and because of the interaction produced by subtracting the sum of Phase A 38 and Phase B 41 into the driver amplifier 3, the amplitude of the CMV signal passed to the Phase C motor lead 45 is approximately one-third the amplitude of the CMV signal on line 57 introduced to the analog adder 43.

FIG. 6 shows the ideal CMV waveform required for the specific motor example used to develop FIGS. 3 and 4 supra. The triangular nature of the CMV waveform, and the fact that its fundamental component is at three times the conventional drive voltage, is clear. Also shown in FIG. 6 are the conventional drive voltages for the three phases of motor 39 as references. The correct amplitude and phase of the CMV 57 will be a function of the particular motor, but, for a three-phase motor it is a waveform with a fundamental component of three times the frequency of the drive currents. FIG. 6 also shows that the CMV waveform has its peak value when the motor is unbalanced with respect to the positive and negative supplies. On the other hand, the CMV waveform has a value of zero when the motor is balanced with respect to the positive and negative supplies.

Figure 7:
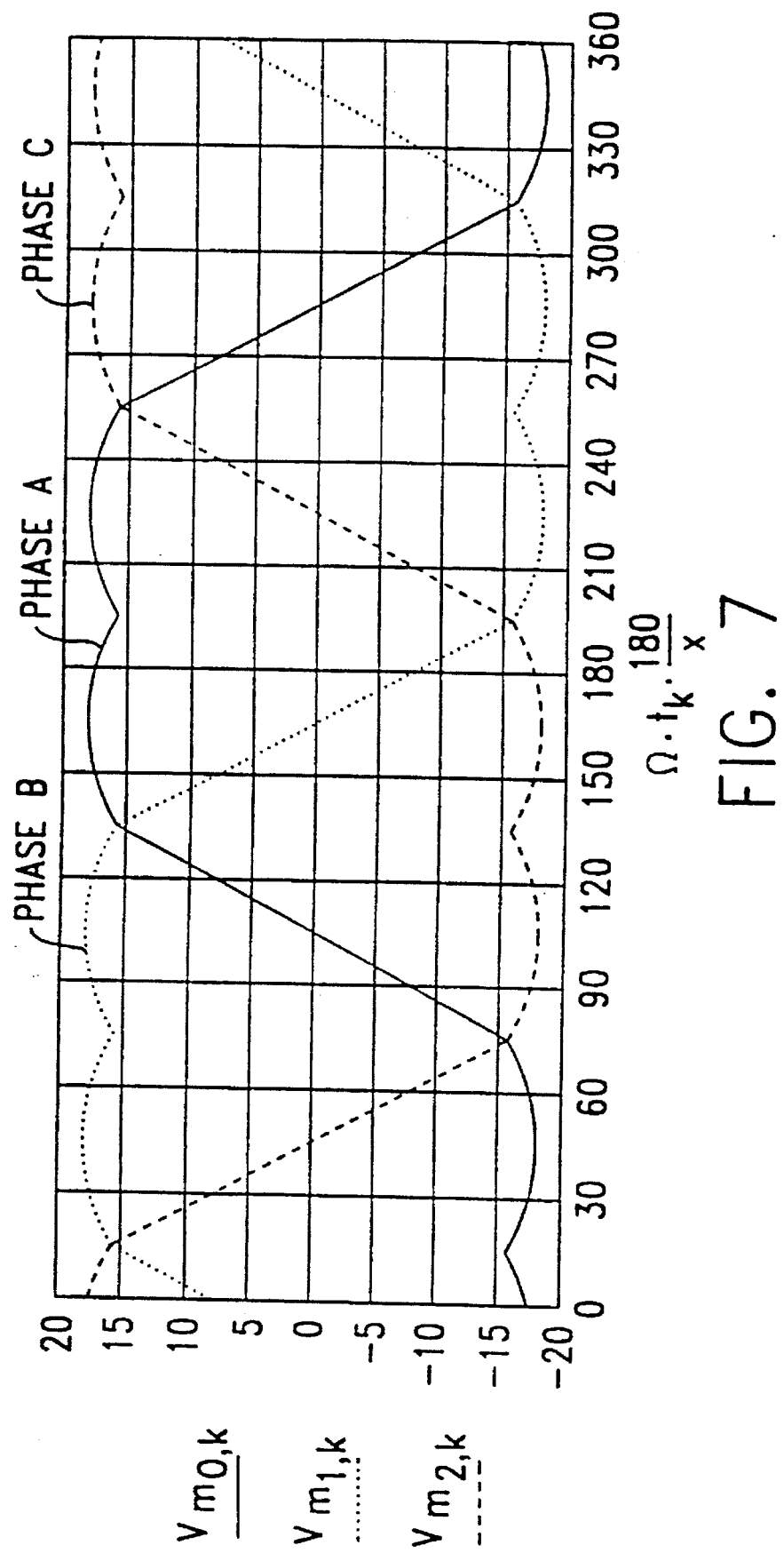
FIG. 7 illustrates the modified drive waveforms, for achieving the same speed with lower supply voltages.

FIG. 7 shows a graph of the three drive waveforms as modified by the addition of the CMV on line 57 to each of the conventional drive voltages. The balanced nature of the drive voltages is evident, as is the reduced positive and negative peak drive voltages by comparison with the voltages required by the conventional method as depicted in FIG. 4. Although the modified drive voltages of FIG. 7 are highly non-sinusoidal, the phase currents remain sinusoidal because the voltages applied across the phase windings of the motor are sinusoidal, even if the voltages (referenced to ground) applied to each of the motor leads 38, 41, or 45 are highly non-sinusoidal. The current drawn by each phase 38, 41 and 45 is totally unaffected by the CMV waveform on line 57 since the CMV is added equally to each of the phase voltages and therefore, there is no change in the voltage across each phase winding. On the other hand, since the supply voltages for a given speed may be reduced, while the needed drive current is unchanged, the power required to drive the system is reduced. Note that the voltages across each phase winding 38, 41, and 45 are unaffected by the CMV waveform on line 57, and remain sinusoidal, contrasted with the phase drive voltages, which are non-sinusoidal.

Most or all of the advantages of the invention may be obtained with approximations to the correct common mode voltage waveshape. An alternative simple, but effective, algorithm uses a common mode voltage that is sinusoidal and of empirically chosen amplitude and phase. The peak amplitude and phase of the sine wave will be approximately equal to the peak amplitude and phase of the ideal common mode voltage.

Figure 8:
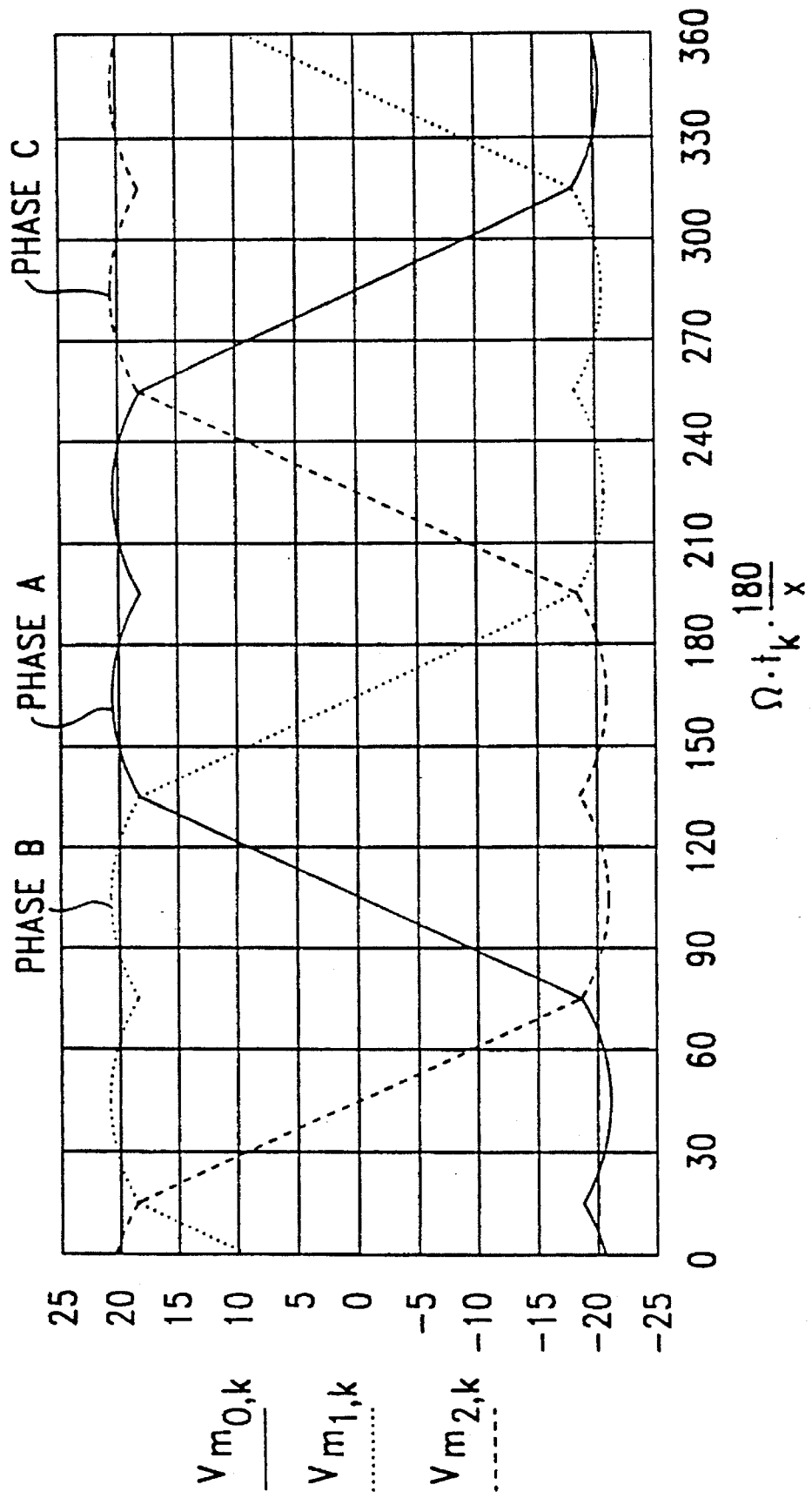
FIG. 8 illustrates the drive waveforms generated in accordance with the present invention for maximizing shaft speeds with a given supply voltage.

FIG. 8 shows the result of using the method of the present invention to increase the speed, in this example by about 30% compared with the conventional method, while maintaining the positive and negative peak voltages at substantially the same level that the conventional method needed to produce a 23% lower speed.

Figure 9A:
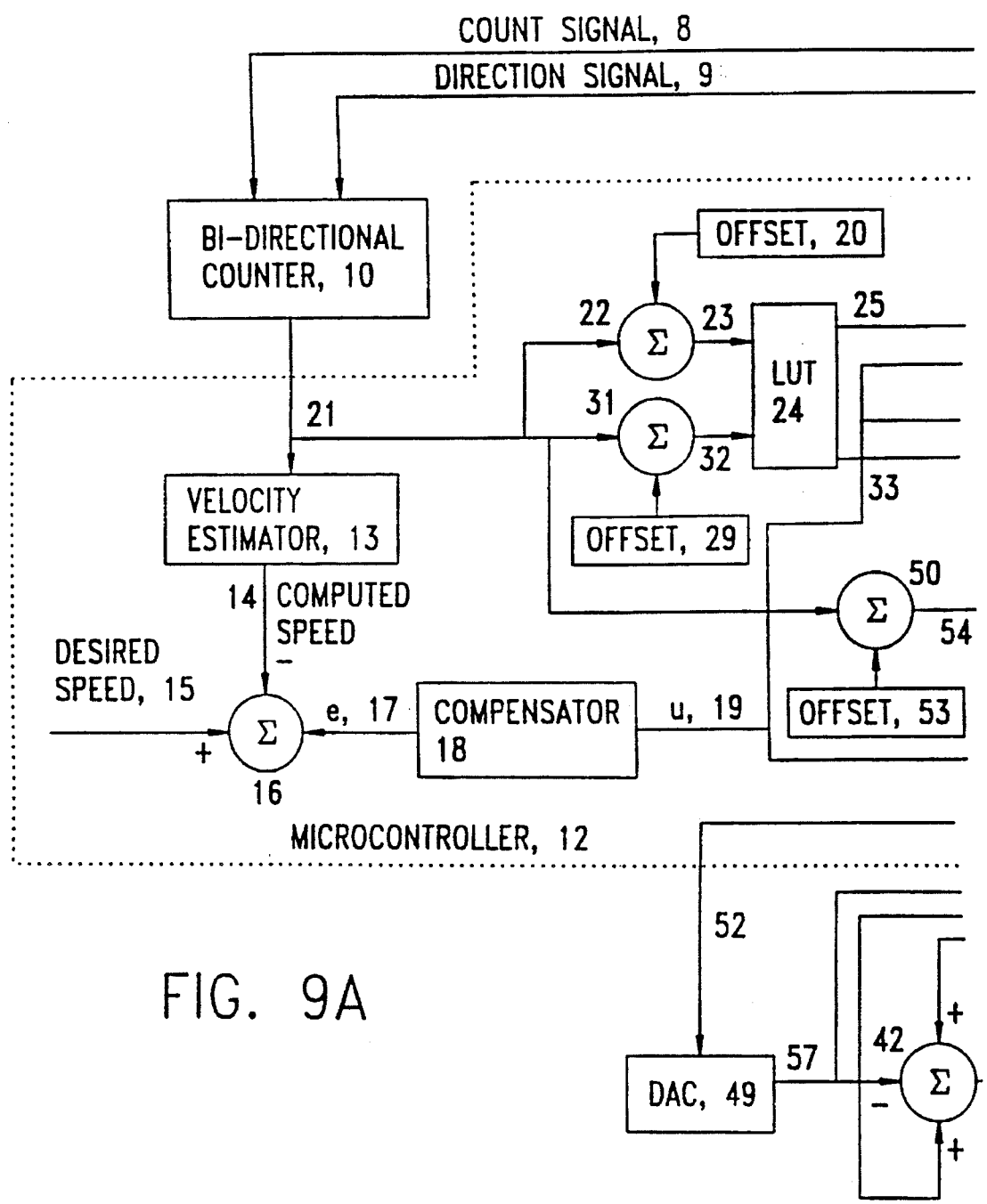
FIG. 9 is a block diagram of an alternative preferred embodiment of an apparatus constructed in accordance with the present invention.
Figure 9B:
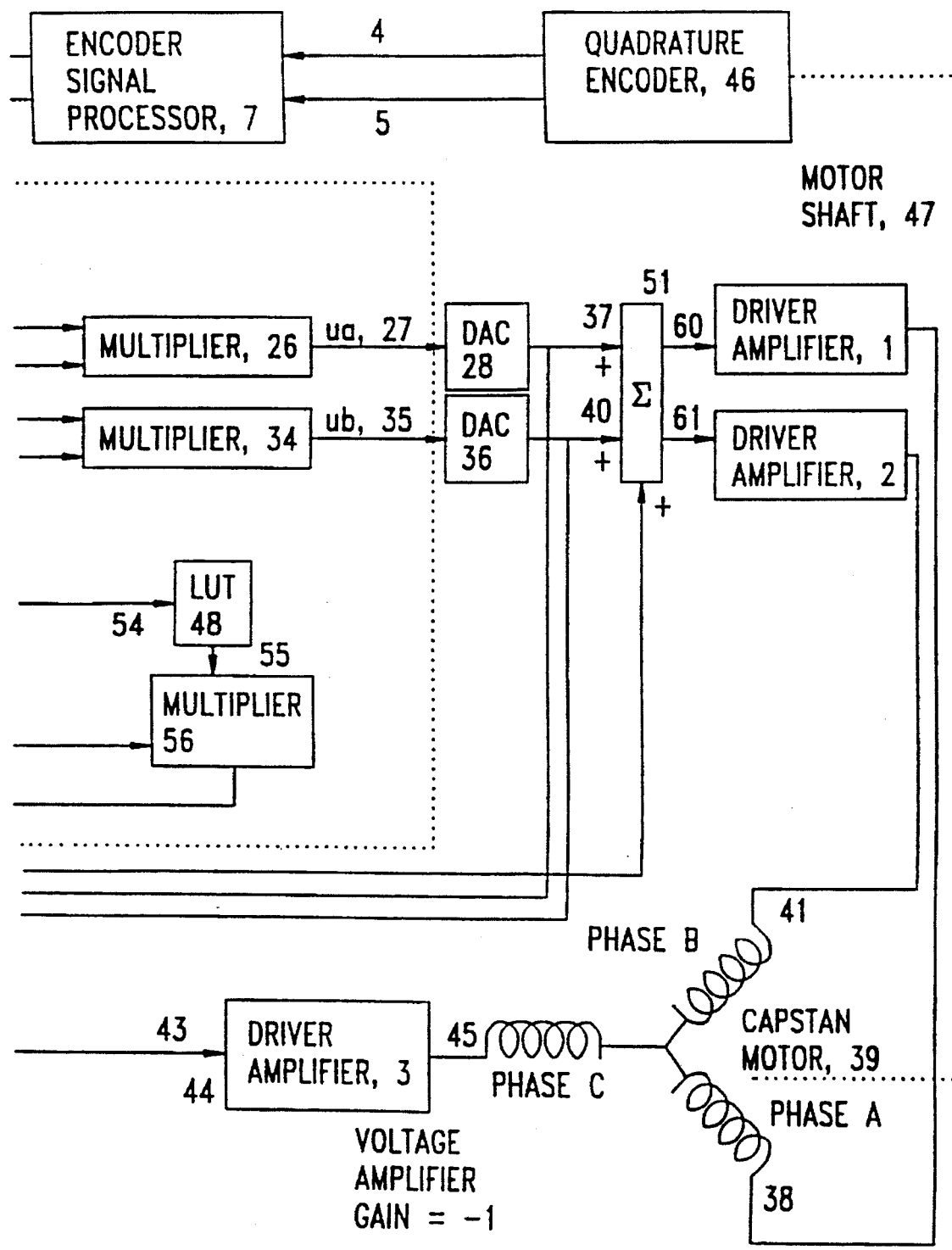

An alternate embodiment of the present invention is shown in FIG. 9. The components leading to the microcontroller 12 are the same as those discussed with reference to FIG. 5. The differences will be discussed further below.

The bi-directional counter output on line 21 is passed to the microcontroller 12. During the servo sampling interval the microcontroller 12 performs a number of calculations to produce two sinusoidal control signals on lines 37, 40 and the common mode signal on line 57. The sinusoidal control signals on lines 37 and 40 are added to the CMV signal on line 57 at summing node 51 thereby generating two outputs on lines 60 and 61, respectively. One output of the summing node 51, is a first modified control signal on line 60 is passed to the driver amplifier 1 whose output commutates the Phase A motor lead 38 of the motor 39. A second output of the summing node 51, a second modified control signal on line 61 is also passed to driver amplifier 2 whose output commutates the Phase B motor lead 41 of the motor 39. Similarly, the control signals on lines 37 and 40 are added to the CMV signal on line 57 through adder 42 the output of which is the modified control signal on line 43 that is transmitted to the driver amplifier 3, whose output commutates the Phase C motor lead 45 of the motor 39.

The bi-directional counter output on line 21 is passed to the microcontroller 12 through the velocity estimator 13, to obtain the present speed of the motor shaft on line 47. The computed shaft speed on line 14 is subtracted from the desired speed on line 15 at subtractor 16, to obtain the speed error e of the motor 39 on line 17. The speed error e on line 17 is passed to a compensator 18 whose output is the control authority signal u on line 19. A first offset 20 having a value of 22° for every 62 ips, proportional to speed is added to the bi-directional counter output on line 21 through adder 22, to generate a phase advanced signal of the bi-directional counter output on line 23. The phase advanced signal on line 23 is used to address the LUT 24 containing digital words that are a sinusoidal function of the address transmitted to the LUT 24 on line 23. The output of the LUT 24 on line 25, is multiplied by the control authority signal u on line 19, at multiplier 26, to obtain a modified authority signal ua on line 27. The modified authority signal ua on line 27 is passed through a DAC 28 whose output is a first control signal on line 37. The control signal on line 37 is added to the CMV on line 57 at summing node 51 thereby generating a first modified control signal on line 60, that is transmitted to driver amplifier 1, used to commutate Phase A 38 of the motor 39. A second offset 29 having a value of 120° plus 22° for every 62 ips, proportional to speed is added to the bi-directional counter output on line 21 at adder 31 thereby generating a phase advanced signal of the bi-directional counter on line 32. The phase advanced signal on line 32 is used to address the LUT 24 whose output 33 is multiplied by the control authority signal u on line 19 at multiplier 34, to obtain a modified authority signal ub on line 35. The modified authority signal ub on line 35 is passed through to a second DAC 36 whose output is a second control signal on line 40. Control signal 40 is added to the CMV signal on line 57 at summing node 51 to produce the second modified control signal on line 61 which commutates the Phase B 41 of the motor 39 via driver amplifier 2. The CMV signal on line 57 is added to the first control signal on line 37 and second control signal on line 40 at adder 42. The output of the adder 42 is transmitted to a driver amplifier 3 whose output commutates the Phase C 45 winding of the motor 39.

The components which generate the CMV waveform on line 57 are shown in FIG. 9. A third offset 53 having a value of 180° plus one-third (⅓) of 22° for every 62 ips proportional to speed is added to the bi-directional counter output on line 21 at adder 50. The output of the adder 50 on line 54, is used as an address to the LUT 48. The contents of the LUT 48 are such as to produce the CMV signal on line 57 depicted to FIG. 6, when driven by the signal on line 54. The output of the LUT 48 on line 55 is passed through the DAC 49 whose output is transmitted to an adder 42 and the summing node 51 on line 57. Since driver amplifier 3 is inverting, the CMV signal on line 57 is subtracted from the input of the adder 42, but added to the inputs of the summing node 51. In this way, the CMV signal on line 57 is introduced as a common additive signal to all three phases. The multiplier 56 ensures that the CMV signal on line 57 is proportional to the drive voltages. A general algorithm, suitable for determining the correct CMV waveform on line 57 for a particular shaft position is: the CMV amplitude is equal to one-half the phase drive voltage whose absolute value, in absence of the CMV, is the smallest of:

$$CMV = \tfrac{1}{2}|V_p|$$

where the amplitude of the CMV signal is proportional to speed and empirically determined to be 5 volts peak-to-peak per 60 ips.

Figure 10A:
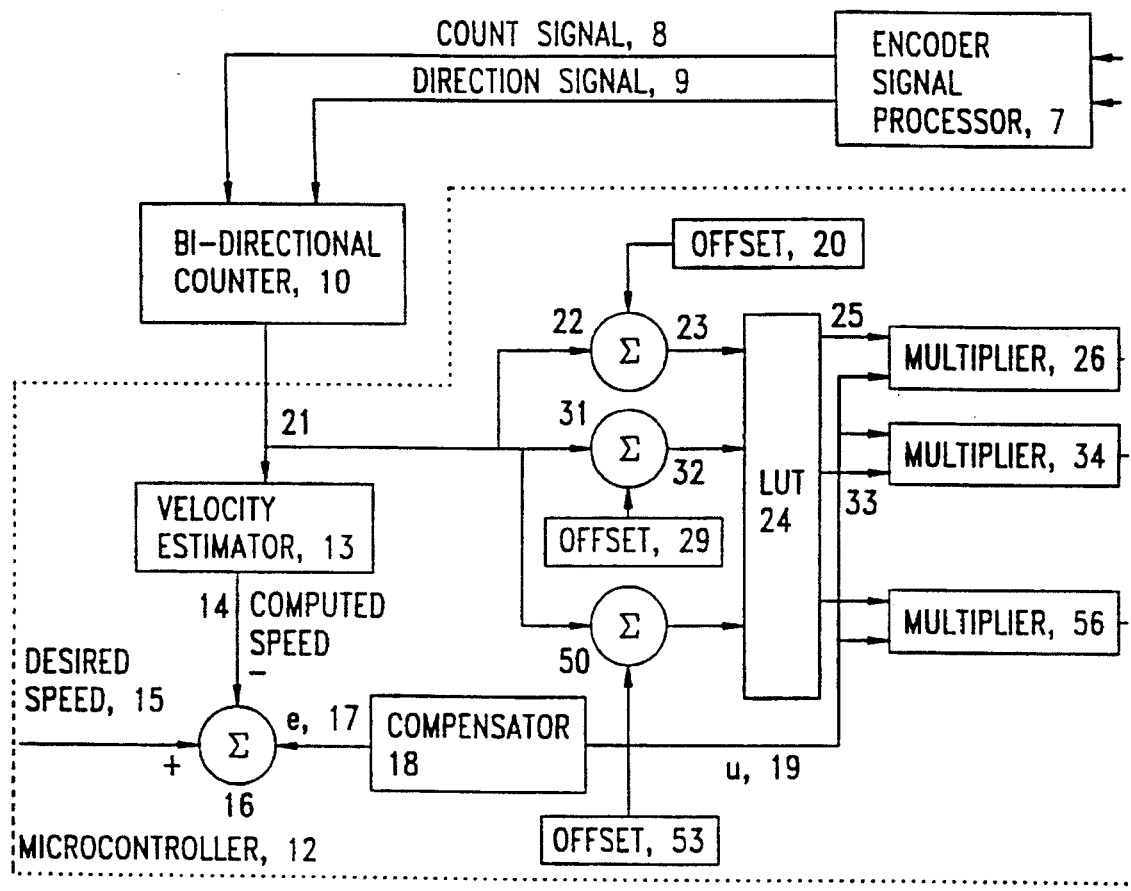
FIG. 10 is a block diagram of another alternative preferred embodiment of an apparatus constructed in accordance with the present invention.
Figure 10B:
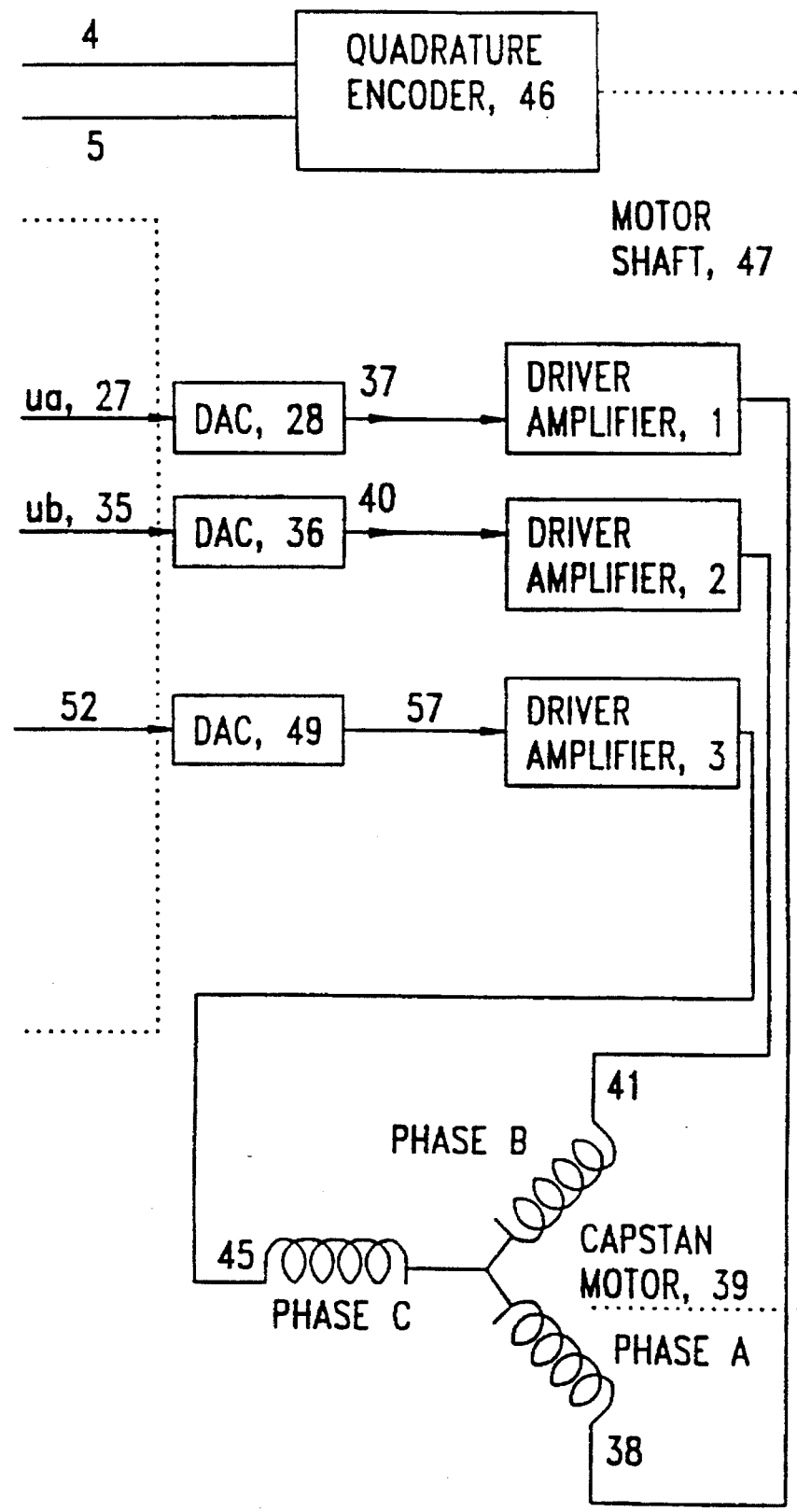

Another alternate embodiment of the present invention, is shown in FIG. 10. This embodiment is the same as that described with reference to FIG. 5, above, except that the analog adder 43 has been removed and the driver amplifier 3 is non-inverting. The embodiment illustrated in FIG. 10 operates by having the LUT 24 store both the control and common mode voltage waveforms, exemplified by any one of the three wave shapes of FIG. 6, and the CMV waveform.

A first offset signal 20 having a value of 22° for every 62 ips, proportional to speed, is added to the bi-directional counter output on line 21 at adder 22, thereby producing a phase advanced signal on line 23. Line 23 is used to address the LUT 24. The LUT 24 contains digital words that are a sinusoidal representation of the address transmitted to its input via line 23. The output of the LUT 24 on line 25, is multiplied by the control authority signal u on line 19 at multiplier 26, to obtain a modified authority signal ua on line 27. The modified authority signal ua on line 27 is passed through a first DAC 28, the output of which, a first control signal on line 37, is transmitted to driver amplifier 1. The output of driver amplifier 1 commutates the Phase A lead 38 of the motor 39. A second offset signal 29 having a value of 120° plus 22° for every 62 ips proportional to speed, is added to the bi-directional counter output on line 21 at adder 31 to obtain the phase advanced signal on line 32. The phase advanced signal on line 32 is used to address the LUT 24 whose output on line 33 is multiplied by the control authority signal u on line 19 at multiplier 34, to obtain the modified authority signal ub on line 35. The modified authority signal ub on line 35 is passed through a second DAC 36, the output of which, a second control signal on line 40, is transmitted to driver amplifier 2. The output of the driver amplifier 2 commutates the Phase B lead 41 of the motor 39.

A third offset signal 53 having a value of 180° plus one-third (⅓) of 22° for every 62 ips proportional to speed is added to the bi-directional counter output on line 21 at adder 50. The output of adder 50 is used to address the LUT 24 whose output is multiplied by the control authority signal u on line 19 at multiplier 56, to obtain the CMV waveform on line 52 whose amplitude is proportional to that of the first control signal on line 37 and second control signal on line 40. The CMV waveform on line 52 is then passed through a third DAC 49 whose output is transmitted to driver amplifier 3 whose output commutates the Phase C lead 45 of the motor 39. By introducing the three offsets 20, 29, and 53, all three phase drive waveforms may be generated from one look-up table 24.

Note that the CMV waveform on line 57 need not be precisely as shown in FIG. 6; any reasonable approximation, e.g. a sine wave, will produce most or all of the benefits of the precise waveform. In the case of a sine wave CMV, LUT 48 shown in FIG. 5 may be dispensed with since there already exists a LUT 24 whose contents are a sinusoidal representation of the address. Suitable addressing and multiplexing of the LUT 24 will allow it to deliver the sine wave CMV signal of correct amplitude (still using multiplier 56) and phase (using an appropriate offset to the look-up table address). The magnitude of the common mode voltage is typically about 25% of the peak drive voltages; therefore, the number of bits of additional digital-to-analog converter 28, 36, and 56 of FIGS. 5 and 9 need only be one fourth of the number of bits of the two digital-to-analog converters 28 and 36 need to driver amplifiers 1 and 2. By contrast, in the embodiment of FIG. 10, all three digital-to-analog converters 28, 36, and 49 must have the full number of bits.

Although the preferred embodiment has been described in the context of a speed control system, with conventional approaches, bi-directional speed control systems and positioning control systems are examples of control systems which would benefit from the use of the invention. The preferred embodiment has been described using a dual power supply with equal positive and negative voltages; the invention is equally applicable to a single power supply system in which the ground of the dual supply system is replaced with half of the single supply voltage. Further, the speed control system described above will also work with a system that uses a shaft once per revolution index signal. Since there need be no ground current in the dual supply system, the half voltage of the single supply system is purely notional.

It should be understood that although the preferred embodiments of the present invention have been illustrated and described, various modifications thereof will become apparent to those skilled in art; and, accordingly, the scope of the present invention should be defined only by the appended claims and equivalence thereof.

I claim:

1. A method of increasing the efficiency of a multiphase motor having a plurality of phase windings comprising the steps of:

(a) obtaining the voltage amplitude for each phase of said motor;

(b) determining the smallest voltage amplitude of the motor phase windings;

(c) generating a common mode voltage equal to one-half the absolute value of said smallest voltage amplitude;

(d) summing said common mode voltage with said voltages from each phase of said motor thereby creating a modified control voltage; and (e) commutating said motor with said modified control voltage.

2. A method of increasing the efficiency of a motor comprising the steps of:

(a) obtaining velocity and position information from said motor;

(b) generating a reference signal from said velocity and said position information;

(c) generating a control signal based on said reference signal;

(d) generating a common mode signal based on said reference signal;

(e) summing said control signal and said common mode signal to produce a modified control signal;

(f) commutating said motor with said modified control signal and wherein step (d) comprises the steps of:
  (a) adding a predetermined value to said reference signal to produce a third signal;
  (b) addressing a look-up-table containing a plurality of values with said third signal; and
  (c) multiplying the output of said look-up-table to produce said common mode signal.

3. A motor apparatus for a tape drive, comprising:

a motor;

a processing circuit coupled to said motor, which generates a reference signal;

a microcontroller coupled to said processing circuit, said microcontroller operative to produce a first control signal and a second control signal responsive to said reference signal, said microcontroller comprising an adder coupled to said processing circuit operative to add said reference signal to an offset value to produce an address, a look-up-table, coupled to said adder, which provides a common mode signal responsive to said address, a multiplier coupled to said look-up-table, to ensure said common mode signal amplitude is proportional to that of said first control signal and said second control signal; and a summing circuit, coupled to said first control signal, said second control signal, and said common mode signal to produce a modified control signal, said modified control signal being electrically interconnected to said motor to commutate said motor.

4. A motor apparatus for a tape drive, comprising:

a brushless motor comprising a stator and a rotor;

electronic means, coupled to said motor, for generating a reference signal based on position of said rotor, said electronic means further including circuitry responsive to said reference signal to generate a control signal and an in phase common mode signal that varies in accordance with rotor position; and summing means, coupled to said electronic means, for adding said control signal and said in phase common mode signal to produce a modified control signal, said modified control signal operative to commutate said motor.

5. The apparatus of claim 4, wherein said electronic means comprises a microcontroller.

6. The apparatus of claim 4, wherein:

said motor is a multiphase motor having a plurality of stator phase windings; and said electronic means comprises:

a low output impedance amplifier coupled to supply a first one of said stator phase windings and a high output impedance amplifier coupled to supply a second one of said stator phase windings.

7. A motor apparatus for a tape drive, comprising:

a multiphase brushless motor;

a processing circuit, coupled to said motor, which generates a reference signal based on motor rotational position;

a microcontroller, coupled to said processing circuit, said microcontroller comprising control signal generating means for generating motor control signals in response to said reference signal;

a first digital to analog converter means coupled to said control signal generating means to provide an analog control signal;

a drive amplifier coupled to receive said analog control signal to produce a motor drive signal applied to a first phase winding of the motor;

said microcontroller further comprising a common mode signal generating means responsive to said reference signal to generate a common mode signal that varies in accordance with rotor position;

a second digital to analog converter coupled to said common mode signal generating means to provide an analog common mode signal;

a summing circuit, coupled to receive said motor drive signal and said analog common mode signal, to produce a modified control signal for applying a drive signal to a second phase winding of the motor;

said common mode signal generating means comprising adding means, coupled to said processing circuit, for adding said reference signal to an offset value to produce an address and a look-up-table, coupled to said adding means, to provide said common mode signal responsive to said address; and wherein:

said look-up-table contains a plurality of values responsive to said address to provide said common mode signal.

8. The apparatus of claim 7, wherein: said common mode signal has a sinusoidal waveform.

9. The apparatus of claim 7, wherein: said common mode signal has a triangular waveform.

* * * * *